United States Patent Office 3,221,066
Patented Nov. 30, 1965

3,221,066
DEHYDROCHLORINATION OF POLYCHLORO CHLOROMETHYLBICYCLOHEPTENES
Paul E. Hoch, Youngstown, N.Y., assignor to Hooker Chemical Corporation, Niagara Falls, N.Y., a corporation of New York
No Drawing. Filed May 8, 1959, Ser. No. 811,812
5 Claims. (Cl. 260—648)

This invention relates to novel reactions which may employ hexachlorocyclopentadiene as starting material and to a new and useful product obtained from such reactions.

Hexachlorocyclopentadiene may be reacted with allyl chloride to yield

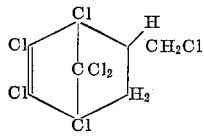

1,4,5,6,7,7 - hexachloro - 2-chloromethyl-bicyclo-(2.2.1)-heptene-5. It is a finding of this invention that this material in turn may be dehydrohalogenated to yield the novel

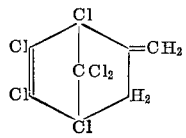

1,4,5,6,7,7 - hexachloro-2-methylene-bicyclo-(2.2.1)-heptene-5. It is yet another finding of this invention that the foregoing material is a useful insecticide.

The equations for the foregoing reactions are as follows:

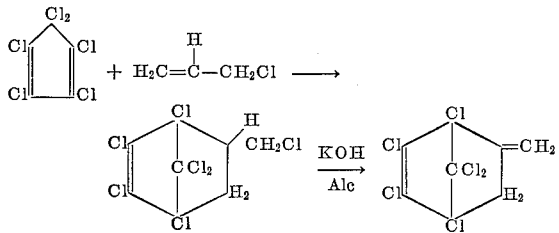

The invention is further illustrated by the following examples and disclosure.

*Example 1.*—*The preparation of 1,4,5,6,7,7-hexachloro-2-chloromethyl-bicyclo-(2.2.1)-heptene-5*

A flask was charged with five hundred and forty-six grams (two moles) of hexachlorocyclopentadiene and one hundred and fifty-three grams (two moles) of allyl chloride. The contents were stirred and heated to reflux at sixty-two degrees centigrade. The temperature rose to one hundred and seventy-two degrees centigrade slowly over a period of four and one-half days. At this point, the contents were subjected to a distillation. A solid was obtained having a boiling point of one hundred and twenty-five to one hundred and thirty degrees centigrade at a pressure of 2 to 2.5 mm. and a melting point of fifty-two to fifty-three degrees centigrade.

*Example 2.*—*The preparation of 1,4,5,6,7,7-hexachloro-2-methylene-bicyclo-(2.2.1)-heptene-5*

To a solution of 11.5 grams of potassium hydroxide in one hundred and fifty milliliters of ethanol (absolute) heated with stirring to fifty-five degrees centigrade was added portionwise fifty-four grams of the adduct of Example 1 over a period of fifteen to twenty minutes. After the addition, the suspension was stirred one hour at fifty-five degrees centigrade. The mixture was filtered, then two-thirds of the alcohol was removed by vacuum distillation. The residue was diluted with approximately one liter of water and this suspension was extracted with methylene chloride. The organic layer was dried, then submitted to a vacuum distillation. After removal of solvent an oil was obtained which when distilled had a boiling point of seventy-four to seventy-nine degrees centigrade at a pressure of 0.2 to 0.3 mm.

*Anal.*—Calc'd for $C_8H_4Cl_6$: Cl, 68.0. Found: Cl, 67.8 $n_D^{25°}$ 1.5590.

Among the dehydrohalogenating agents which may be used in the present invention are (1) alcoholic bases; and (2) tertiary amines. Alcohols of (1) may be ethanol, methanol, propanol, etc. Bases of (1) may typically be KOH or NaOH. The tertiary amines may be triethyl amine, tripropyl amine, etc., in appropriate solvents such as benzene, toluene, etc.

The temperatures employed in carrying out reactions typified by Example 2 will generally be from twenty-five to eighty degrees centigrade and preferably from fifty to seventy degrees centigrade at atmospheric pressure.

The compound of this invention is capable of being diluted with a solvent, such as benzene, to form solutions or dispersions which are effective against insects. This insecticide may be applied in any of the conventional methods. Thus, for example, it may be used in aqueous emulsions or may also be incorporated in organic liquids such as the aromatic hydrocarbons for spraying purposes. It may also be effectively used in dusts with such inert solid diluents as kieselguhr, wood flour, walnut shell, talc and the like.

The insecticidal activity of the product of Example 2 is demonstrated by the following tests against the housefly:

INSECTICIDAL TEST DATA

| Concentration, percent: | Product of Example 2 |
|---|---|
| 1 | 100% kill |
| 0.1 | 50% kill |

In obtaining the foregoing insecticidal test data, water emulsions or water suspensions were used with benzene as a solvent and with Triton X–100 (an alkyl aryl polyether alcohol manufactured by the Rohm and Haas Company) as an emulsifier. A Waters vertical spray tower was used. In this procedure a spray is injected through a glass atomizer into an eight-inch stainless steel cylinder to test insects forty-four inches below the nozzle. The samples were made at one percent and 0.1 percent dilution. Fifty flies of the strain of the Chemical Specialties Manufacturer Association were placed in a two-inch by five-inch stainless steel cage faced on top and bottom with fourteen mesh screen. The flies were retained in the cage for knockdown observations and for mortality determination after twenty-four hours.

The compound of the present invention may also be used in the preparation of polymers which are, due to the high chlorine content, flame retardant in nature. The compound of the present invention may also be used as a flameproofing agent. In addition, the compound of the present invention finds utility as a chemical intermediate.

It is to be understood that various modifications within the invention are possible, some of which have been referred to above; therefore, I do not wish to be limited except as defined by the appended claims.

I claim:
1. The process of preparing 1,4,5,6,7,7-hexachloro-2-methylene-bicyclo-(2.2.1)-heptene-5 which comprises reacting 1,4,5,6,7,7-hexachloro - 2 - chloromethylbicyclo-(2.2.1)-heptene-5 with an alcoholic base at a temperature of twenty-five degrees centigrade to eighty degrees centigrade at atmospheric pressure and recovering 1,4,5,6,7,7-hexachloro-2-methylenebicyclo-(2.2.1)-heptene-5 as a product of the process.

2. The process of claim 1 wherein the base is potassium hydroxide and the reaction temperature is fifty to seventy degrees centigrade.

3. A process for preparing 1,4,5,6,7,7-hexachloro-2-methylene-bicyclo-(2.2.1)-heptene-5 which comprises reacting 1,4,5,6,7,7-hexachloro - 2 - chloromethylbicyclo-(2.2.1)-heptene-5 with an alcoholic base dehydrohalogenating agent and recovering 1,4,5,6,7,7-hexachloro-2-methylenebicyclo-(2.2.1)-heptene 5 as a product of the process.

4. A process of preparing 1,4,5,6,7,7-hexachloro-2-methylene-bicyclo-(2.2.1)-heptene-5 which comprises reacting hexachlorocyclopentadiene with allyl chloride to obtain 1,4,5,6,7,7-hexachloro - 2 - chloromethylbicyclo-(2.2.1)-heptene-5; reacting this material with an alcoholic base dehydrohalogenating agent and recovering 1,4,5,6,7,7-hexachloro-2-methylenebicyclo-(2.2.1)-heptene-5 as a product of the process.

5. A process for preparing 1,4,5,6,7,7-hexachloro-2-methylenebicyclo - (2.2.1.) - heptene - 5 which comprises contacting 1,4,5,6,7,7 - hexachloro-2-chloromethylbicyclo-(2.2.1)-heptene-5 with an alcoholic solution of an alkali metal hydroxide, and separating 1,4,5,6,7,7-hexachloro-2-methylenebicyclo-(2.2.1)-heptene-5 as a product of the process.

References Cited by the Examiner
UNITED STATES PATENTS

| | | | |
|---|---|---|---|
| 2,314,846 | 3/1943 | McClellan | 260—468 |
| 2,382,037 | 8/1945 | Bruson | 260—648 |
| 2,671,043 | 3/1954 | Gilbert | 167—30 |
| 2,676,132 | 4/1954 | Bluestone | 260—648 |
| 2,777,794 | 1/1957 | Kenaga | 167—30 |
| 2,802,862 | 8/1957 | Senkbeil | 260—487 |
| 2,831,900 | 4/1958 | Ferentchak et al. | 260—648 |
| 2,841,484 | 7/1958 | Johnson | 71—2.3 |
| 2,841,485 | 7/1958 | Johnson | 71—2.3 |
| 2,881,223 | 4/1959 | Schmerling | 260—648 |
| 2,912,356 | 11/1959 | Schmerling | 260—648 |
| 2,960,541 | 11/1960 | Elam et al. | 260—648 |
| 3,136,688 | 6/1964 | Frensch et al. | 260—648 X |

FOREIGN PATENTS 764,720   1/1957   Great Britain.

LEON ZITVER, *Primary Examiner.*

MORRIS O. WOLK, ALLAN M. BOETTCHER, ALPHONSO D. SULLIVAN, ABRAHAM RIMENS, MILTON STERMAN, *Examiners.*